Jan. 12, 1971            C. P. MROSS            3,554,052
RAPIDLY ATTACHABLE SPINNER KNOB FOR AUTOMOTIVE STEERING WHEELS
Filed April 25, 1969
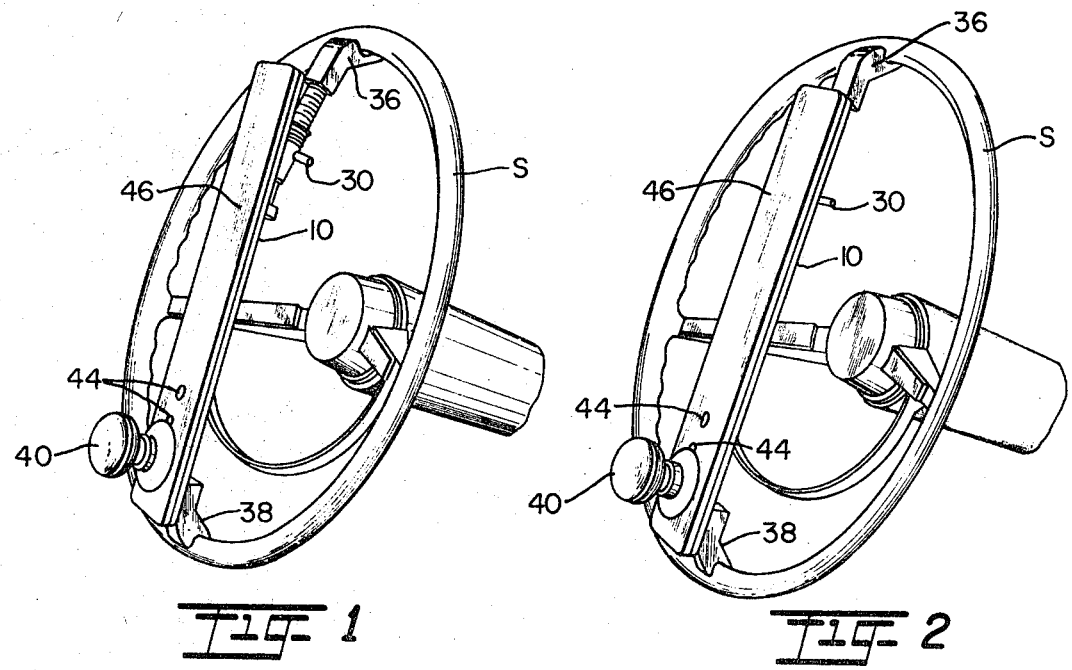
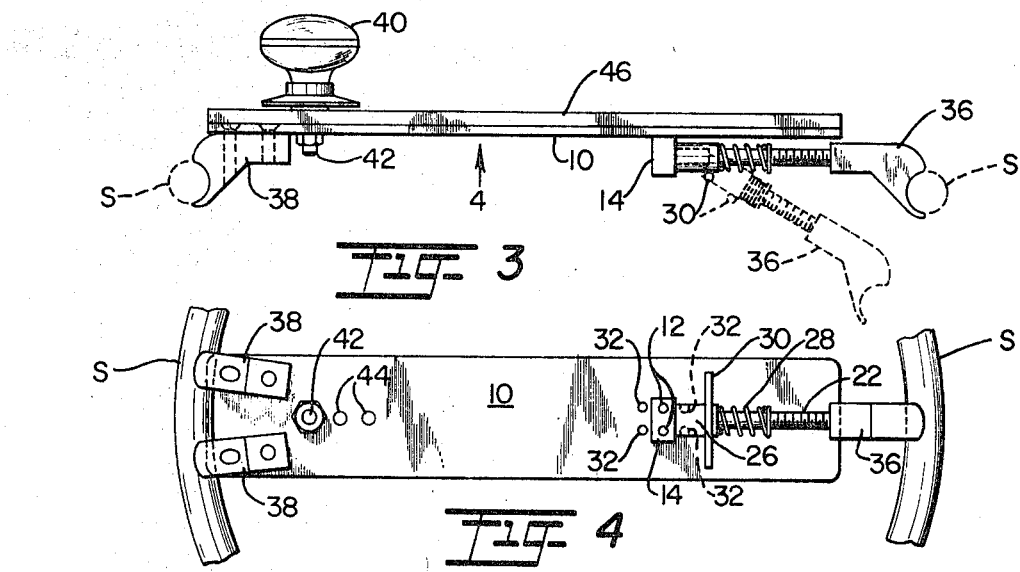
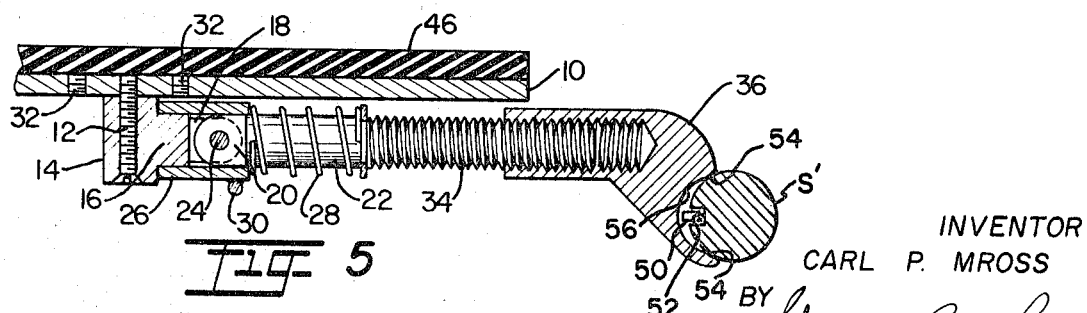
INVENTOR
CARL P. MROSS
BY
Sheridan, Ross & Burton
ATTORNEYS

United States Patent Office 3,554,052
Patented Jan. 12, 1971

3,554,052
RAPIDLY ATTACHABLE SPINNER KNOB FOR AUTOMOTIVE STEERING WHEELS
Carl P. Mross, Denver, Colo., assignor to Robert E. Royce, Englewood, Colo.
Filed Apr. 25, 1969, Ser. No. 819,358
Int. Cl. B62d 1/22
U.S. Cl. 74—557                                                                11 Claims

ABSTRACT OF THE DISCLOSURE

An improved automobile steering wheel spinner knob or handle device which may be adjusted to dispose the knob to various desired positions along a diameter within the wheel rim and be quickly adjusted to engage rims of various diameters and without causing any damage to the steering wheel. The device may be mounted in any diametral plane of the steering wheel. Its application or removal from the wheel rim is a manual operation, without the use of tools, rendering it of particular utility in instances where two or more persons operate a vehicle, only one of which persons requires use of the device, exemplary of which is a handicapped person who may occasionally operate one or more available automobiles, such as those normally operated by unhandicapped members of his family.

BACKGROUND OF THE INVENTION

Presently available steering spinner knobs, which enable an operator to rotate rapidly a steering wheel in either direction and with one hand, are generally attached to the wheel rim by a clamping device which requires a tool, such as a screw driver or wrench, for their application or removal. Such clamping devices tend to damage seriously the steering wheel. Also, the axis of rotation of the knob is in a position perpendicular to the plane of the rim and generally intersecting the mean diameter of the wheel cross section, thus providing no choice of adjustment of its lever arm. With the advent of power steering assist devices, steering may be effected with only a small fraction of the force or effort formerly required, hence a choice of lever arm length becomes advantageous in some instances to obviate moving the knob about an excessive circular path entailing a like manipulation of the arm of the operator and requiring greater time.

In addition to the non-adjustability of the lever arm, and more importantly, the attachment to the wheel rim with tools, as previously referred to, is cumbersome and time consuming which presents problems in those instances where it is desired to apply or remove rapidly the knob from a steering wheel at desired times, an example of which has previously been set forth. Also, a clamping device cuts into the steering wheel and becomes loosened relatively easy.

SUMMARY OF THE INVENTION

The present invention obviates the disadvantages just referred to, and others, by the provision of a steering knob support member to which the knob is adjustably secured, the member being adjustable in length to fit wheels of different diameters and manually attachable to the wheels, without tools, by merely disposing it in its desired position, manually applying a small force to same and positively locking it when it has been moved to its proper position. The application or removal can be effected, if desired, in something of the order of about several seconds.

One of the principal objects of this invention is to provide a steering knob means for automotive steering wheels which can be rapidly mounted and removed from a steering wheel without the use of tools or the like.

Another object of this invention is to provide an attachment adapted to be applied to automotive steering wheels having rims of different diameters and different convex cross sections, said attachment including a member having ends shaped to abut the rim of a steering wheel at angularly spaced positions thereon, each position being disposed on the inner half section of the rim and at each side of its plane thereby to prevent movement of the ends in a direction perpendicular to the plane of the rim, means for adjusting the distance between said ends, whereby the member may be attached to wheels of various sizes, said means also being adapted to adjust the radial outward pressure of the ends against the rim, means moveably carrying one of said ends, by said member, between a first position in which said member is securely attached to said rim and a second position in which it may be removed from the rim, means for locking the one of said ends in said first position, and a steering handle carried by said member, between its ends, projecting upwardly from the plane of the rim, adapted to be grasped by one hand of the operator for rotating the wheel in either direction.

Another object of this invention is to provide an attachment as aforedescribed wherein said means moveably carrying the one of said ends comprises a portion of a toggle linkage adapted to develop its maximum outward radial force at a position in which said means for locking is operative.

Another object of this invention is to provide an attachment as aforedescribed wherein said ends are constructed to dispose said member in a position spaced upwardly from the plane of the rim to clear any obstructions, such as a horn ring, disposed in a space within the rim.

Another object of this invention is to provide an attachment as aforedescribed wherein said member has an elongated plate, said plate having a bracket fixed to its lower surface, an adjustable length rod pivotally carried at one end of same by said bracket, one of said ends being threadedly carried by said rod, a locking sleeve slideable on said rod, and a spring for moving said sleeve into locking engagement with said bracket, said sleeve being manually moveable against the urge of the spring to a position to permit pivotal movement of the rod relative to said member.

Another object of this invention is to provide an attachment as aforedescribed in which each of said ends has a pair of spaced apart surface portions and a recess portion formed intermediate said spaced apart surface portions, said spaced apart surface portions being constructed to engage spaced apart portions of the inner half section of the rim of a steering wheel.

Other objects will become more apparent from the following description, appended claims and accompanying drawings.

BRIEF DESCRIPTION OF THE DRAWINGS

FIG. 1 is a perspective of the subject of the invention applied to a conventional steering wheel just prior to being locked to same;

FIG. 2 is a like perspective illustrating the locked position;

FIG. 3 is a side elevation of the invention illustrating the locked and, in dotted lines, the unlocked position of a toggle mechanism;

FIG. 4 is a lower plan as viewed in the direction of arrow 4, FIG. 3; and

FIG. 5 is an enlarged longitudinal section of the toggle mechanism and showing a modified steering wheel.

DESCRIPTION OF THE PREFERRED EMBODIMENTS

Referring now to the drawing, the subject of the invention comprises a bar or plate 10 to which is affixed, by a pair of screws 12 (see FIGS. 4 and 5), a bracket 14 having a cylindrical lateral projection 16 terminating in bifurcated legs 18 between which is disposed the flattened end 20 of a cylindrical rod 22, secured to legs 18 by a pivot pin 24. A cylindrical sleeve 26, slideable along the rod and urged by a spring 28, as best shown in FIG. 5, cooperates with a portion of rod 22 and projection 16 to lock the rod against pivotal movement relative to the bracket. A pin or handle 30, attached to the sleeve, may be manually grasped to slide the sleeve, against urge of the spring, out of engagement with the projection in which position the rod may be pivoted to an unlocked position as best shown in the dotted position of FIG. 3. The bracket may be secured to the bar or plate 10 in any of several positions by engagement of screws 12 in pairs of spaced threaded apertures 32. Also, threads 34 are provided on the rod which engage a steering wheel abutment member 36.

Two similar abutments 38, are affixed to the other end of the plate, these, together with abutment 36 forming a three point abutment system with steering wheel S to affix more rigidly the plate to same to resist any relative movement between the plate and steering wheel. As will be apparent, the distance between abutments 38, 38 and abutment 36 may be varied by the choice of pairs of aperture 32 to which bracket 14 is affixed and intermediate other adjustment may be attained by rotation of abutment 36 on rod 22. The distance referred to may thus be varied as desired, within the range of the adjustments, to attach the plate to steering wheels of various diameters and also the radial outward pressure which the abutments apply to the steering wheel may be varied. It will be apparent that if the various steering wheels to which the device is to be attached do not vary considerably in diameter, the threaded adjustment may be employed without repositioning bracket 14 on plate 10. Also, by lengthening the shank of abutment member 36 and its threads the length of this adjustment may be increased to render the device attachable to wheels of considerably different diameters, thus entailing only a manual adjustment without the use of tools.

A steering knob 40 is rotatably carried by a shaft 42 which may be affixed to bar 10 in any of various apertures 44, best shown in FIG. 4, to provide a steering lever arm at the knob of desired length. A continuous slot (not shown) may be provided in lieu of apertures 44 to render this adjustment infinitely variable within its range. It will further be understood that while knob 40 is illustrated as circular, it may be of any other suitable shape to fit the desires of the user.

Optionally, but preferably, a sheet 46 of soft material, such as foam rubber, is cemented to the upper surface of bar 10 to provide a cushion for the driver in the event of an unintended rapid stop of the vehicle, such as impact of same with another object. Thus, this device can also be used as an impact bar to absorb energy on impact. It is to be observed that the construction of the herein attachment eliminates or substantially reduces the problems heretofore encountered where such a device snagged on the clothing of the driver.

Referring again to abutments 36, 38, their abutting surfaces are concave and each abuts to rim of the wheel at loci disposed at each side of the central plane of the rim. They are thus similar to V blocks but curved to provide increased area of contact, as compared with a V block which may engage a curved section along a line contact. For a better understanding of the terminology of the claims it will be assumed that the wheel rim is circular, that its plane passes through the center of its section and that a circular plane perpendicular to the rim plane divides the section into an outer half section and an inner half section. The abutments then engage the inner half section at loci at each side of the plane of the rim as distinguished from loci on the outer half section, preventing their movement in a direction perpendicular to the plane of the rim. The clamping pressure on the rim is thus radially outward, placing it in tension.

While plate 10 is illustrated as being constructed of conventional rectangular bar stock for convenience and economy of manufacture, it will be understood that it may be of other cross-sectional shape and of other configuration and be constructed, for example, as a stamping or casting. It is preferred, however, that abutments 38, 38 and 36 engage the wheel rim at at least three angularly spaced zones or loci to thus prevent its angular movement with respect to the rim in the plane of time and also rotation about all radii in said plane to thereby rigidly affix it to the rim against all movement relative to same. Abutments 38, 38 may thus be disposed at the ends of separate radially extending spiders, rather than affixed to a single spider as illustrated, increasing the angle between abutments 38, 38 and increasing the rigidity of its affixation to the rim without applying excessive outward radial pressure by the abutments.

As shown in FIG. 5, a steering wheel S' may be constructed with the horn ring 50 partially disposed within a slot or recess 52 formed in the inner periphery of the steering wheel S'. In order to accommodate a steering wheel of the construction shown in FIG. 5, the ends 36, 38 are formed with a pair of spaced apart surface portions 54 and an intermediate recess portion 56 which is preferably arcuately shaped. The surface portions 54 are shown in FIG. 5 as being disposed in contacting engagement with spaced apart surface portions of the steering wheel S'. Thus, it will be readily apparent that the attachment of this invention may be used for rapid mounting or removal from steering wheels of different diameters, different convex cross-sections, and those which have a horn ring mounted adjacent the periphery thereof.

It is to be understood that this invention is not limited to the exact embodiments of the attachment shown and described, which are merely by way of illustration and not apparent to those skilled in the art.

I claim:

1. An attachment adapted to be applied to automotive steering wheels having rims of different diameters and different convex cross sections, comprising;
   (a) a member having ends shaped to abut a rim of a steering wheel at angularly spaced positions thereon, each position being disposed on the inner half section of the rim and at each side of its plane to thereby prevent movement of the ends in a direction perpendicular to the plane of the rim,
   (b) means for adjusting the distance between said ends, whereby the member may be attached to wheels of various sizes, said means also adapted to adjust the radial outward pressure of the ends against the rim,
   (c) means moveably carrying one of said ends, by said member, between a first position in which said member is securely attached to said rim and a second position in which it may be removed from the rim,
   (d) means for locking the one of said ends in said first position, and
   (e) a steering handle carried by said member, between its ends, projecting upwardly from the plane of the rim, adapted to be grasped by one hand of an operator for rotating the wheel in either direction.

2. An attachment in accordance with claim 1 wherein said means moveably carrying one of said ends comprises a portion of a toggle linkage adapted to develop its maximum outward radial force at a position at which said means for locking is operative.

3. An attachment in accordance with claim 2 wherein said ends are constructed to dispose said member in a position spaced upwardly from the plane of the rim to clear any obstructions, such as a horn ring, disposed in the space within the rim.

4. An attachment in accordance with claim 2 wherein said member is an elongated plate, said plate having a bracket affixtd to its lower surface, an adjustable length rod pivotally carried at one end of same by said bracket, the one of said ends being threadedly carried by said rod, a locking sleeve slideable on said rod, and a spring for moving said sleeve into locking engagement with said bracket, said sleeve being manually moveable against the urge of the spring to a position to permit pivotal movement of the rod relative to said member.

5. An attachment adapted to be applied to an automotive steering wheel rim, comprising;
   (a) a member having a pair of fixed ends thereon adapted to abut the rim at angularly spaced positions thereon, each position being disposed on the inner half section of the rim and at each side of its plane,
   (b) said member carrying a third end disposed substantially diametrically opposite a mid-point between said pair of ends and adapted to abut the inner half section of the rim at a like position,
   (c) said third end being pivotally carried by said member and forming a toggle link, adapted to move radially outward to a desired position when said member is moved toward the plane of the rim,
   (d) means for locking the toggle link to said member at said desired position,
   (e) means for adjusting the radial position of said third end to thereby adjust the outward radial force applied to the rim by the three abutments, and
   (f) a steering handle carried by said member projecting upwardly from the plane of the rim, adapted to be grasped by one hand of an operator for rotating the wheel in either direction.

6. An attachment in accordance with claim 5 wherein said third end is threadedly secured to said toggle link and adapted to vary its length by 360-degree increments of rotation of said third end on said toggle link.

7. An attachment in accordance with claim 5 wherein said ends are so constructed to dispose said member in a position spaced upwardly of the plane of the rim to thereby clear any obstructions, such as horn ring, carried by the steering wheel.

8. An attachment in accordance with claim 5 wherein said steering handle is radially adjustable on said member to thereby vary its lever arm.

9. An attachment in accordance with claim 5 wherein said means for locking the toggle link at said desired position includes manually operable means for permitting and preventing pivotal movement of said toggle link relative to said member.

10. An attachment in accordance with claim 9 wherein said means for locking the toggle link comprises a spring urged locking device movable relative to said member and to said toggle link.

11. An attachment in accordance with claim 1 wherein each of the ends of said member has a pair of spaced apart surface portions and a recess portion formed intermediate said spaced apart surface portions, said spaced apart surface portions being constructed to engage the inner half section of the rim of a steering wheel.

References Cited
UNITED STATES PATENTS 2,305,527   12/1942   Hassett _____ 74—557
2,579,165   12/1951   Woodruff _____ 74—557

FRED C. MATTERN, Jr., Primary Examiner

F. D. SHOEMAKER, Assistant Examiner